3,535,374
PREPARATION OF AMINO CARBOXYLIC ACID SALTS
Philip F. Jackisch, Royal Oak, Mich., assignor to Ethyl Corporation, New York, N.Y., a corporation of Virginia
No Drawing. Filed Nov. 20, 1967, Ser. No. 684,502
Int. Cl. C07c 51/26
U.S. Cl. 260—531   6 Claims

ABSTRACT OF THE DISCLOSURE

Tertiary amino carboxylic acid salts are prepared from tertiary amino alkanols and alkali metal hydroxides as illustrated by the following equation

$$N(CH_2CH_2OH)_3 + 3NaOH \rightarrow N(CH_2COONa)_3 + 6H_2$$

The reaction is preferably conducted in the presence of water and of cadmium catalyst such as cadmium oxide. This invention demonstrates that better results are achieved by promoting the reaction with a long chain paraffin used in conjunction with the water and catalyst. Hexadecane is a typical promoter paraffin. Best results are obtained by use of an excess of metal hydroxide together with the water-paraffin-catalyst system.

BACKGROUND OF THE INVENTION

The conversion of alcohols to the corresponding alkali metal salts of carboxylic acids—by heating the alcohols with alkali metal hydroxides—has been known for over 125 years. In this regard, reference is made to Dumas and Stas, 35 Ann. 129–73 (1840).

The reaction has been extended to amino alcohols; U.S. 2,384,816 and British Pat. 601,816. Attention is directed to Example V of both patents. There a method is described for preparing the tripotassium salt of nitrilotriacetic acid. The method of the example comprises heating—in the presence of water—one mole of triethanolamine with 4.0 moles of potassium hydroxide. (This amounts to a 1.0 mole excess of the hydroxide.) As reported in the example, the total gas volume after 16 hours was 38 liters.

Calculations indicate that the yield of desired salt was very low. Had the reaction gone to completion, six moles of hydrogen would have evolved. (This is depicted by the equation above.) At standard temperature and pressure, six moles of gas occupies 134.4 liters.

Examples II–IV of the above-cited patents also indicate that the patented process affords relatively low yields of other tertiary amino acid salts.

Attention is also directed to U.S. 2,384,217 and British Pat. 601,817. These patents are closely related to those cited above. More specifically, they are directed to use of metal catalysts—such as cadmium oxide—to promote the reaction process described in the aforementioned patents.

U.S. 2,384,817 (p. 4, left-hand column, lines 71–72) states that the process of that patent can be used to prepare tricarboxymethyl amine from triethanolamine. However, no specific example illustrating this reaction is given in the patent (or its British counterpart). Because the preparation of salts of the carboxylic acid corresponding to triethanolamine is a preferred embodiment of my invention, I reacted that amine with sodium hydroxide using cadmium oxide as a catalyst as taught by the patents cited, taking pains to isolate as much product as possible.

More specifically, to a stainless steel flask, fitted with a water separator and a condenser, was charged 18.55 g. (0.126 mole) of triethanolamine, 21.8 ml. of 50.1 percent sodium hydroxide solution (0.415 mole of NaOH) and 1.0 g. (0.00779 mole) of cadmium oxide. Evolved gas was measured with a wet test meter. The reaction mixtures was heated with a silicone oil bath.

The temperature of the oil bath was raised to 150° C. and most of the water was collected. The temperature of the bath was raised to 220° C. and maintained at that temperature for 18 hours at which time gas evolution had essentially ceased. Total gas evolution was 11.55 liters (61.6 percent of theory based on triethanolamine).

The contents of the flask were cooled, 150 ml. of water added and the mixture refluxed for a day to dissolve the contents.

The solution was removed and another 150 ml. of water added. Refluxing was carried out for three more days. This dissolved the remaining contents of the flask.

Both solutions were combined, concentrated on a rotary evaporator, then filtered hot, cooled and diluted to 250 ml. in a volumetric flask.

A qualitative test indicated that a chelating agent was present. Two 10 ml. samples were removed and analyzed for chelating power. The average of the two values corresponded to a yield of 50.2 percent of the theoretical chelating power if all triethanolamine was converted to the compound, $N(CH_2COONa)_3$.

The remaining 230 ml. of solution was acidified to pH 2 with cold sulfuric acid. The acidified solution was evaporated slowly until sodium sulfate just started to crystallize. A white solid, not sodium sulfate, was collected by filtration, water washed, and air dried. It weighed 3.04 grams and had a melting point of 245° d.

A sample was recrystallized from boiling water and had a melting point of 248° d. An infrared sample was identical in all significant details with an authentic sample of $N(CH_2COOH)_3$. Assuming all the 3.04 g. of product was NTA, then the yield was 8.8 percent.

As demonstrated, use of the prior art method gave a low yield of desired product. The experiment reported above also indicates that yields based on chelating effect are misleading as are yields based on amount of gas evolved.

In contrast to the above-cited prior art as shown by the examples below, the process of this invention affords substantially increased yields of acids and acid salts corresponding to amino alcohols.

SUMMARY OF THE INVENTION

The heart of this invention comprises the discovery of the promoter effects of long chain paraffins—in a process which comprises reacting an amino alcohol with an alkali metal hydroxide in the presence of water and a cadmium catalyst.

Thus, in a process which comprises preparation of an alkali metal salt of a tertiary amino carboxylic acid by reacting a tertiary amino alcohol with an alkali metal hydroxide—in the presence of water and a cadmium catalyst—this invention provides the improvement of conducting the process in the presence of a promoter quantity of a long chain paraffin. A preferred embodiment comprises use of an excess of sodium hydroxide in the process.

In general, the salts produced by this process are old compounds, and they have the many uses known for them. Thus, they are chemical intermediates, e.g. yielding the free acids upon acidification. In the main, the acids undergo all the reactions characteristic of carboxylic acids. In addition, the salts are useful in their own right as chelating agents. Nitrilotriacetic acid trisodium salt is becoming of increased importance as an ingredient in detergent formulations.

DESCRIPTION OF PREFERRED EMBODIMENTS

The alkali metal hydroxides employed in my process are preferably sodium and potassium hydroxide. Sodium hydroxide is most preferred because it is cheaper.

The tertiary amine alcohols employed in this process are characterized by a tertiary amino nitrogen atom, that is, an amine nitrogen bonded to three carbons. They are also characterized by the presence of at least primary alcohol group; —$CH_2OH$. In other words, the process of this invention is not applicable to conversion of secondary and tertiary alcohol groups to acid radicals.

It is only necessary that the alkanol amine be stable, reactive, and unhindered. A reactant is stable if it and the product produced therefrom are stable—at least to some appreciable extent—under the reaction conditions employed. Likewise, an amine is reactive if it is free from chemical groups which cause extraneous side reactions to a deleterious degree and is free of chemical groups in such juxtaposition with the reactive sites that they prevent those sites from undergoing the desired reaction because of a perturbation of their electronic configuration. A reactant is unhindered if it is free of groups so bulky that they prevent the reaction from taking place by steric hindrance. So long as these criteria are satisfied, any alkanol amine is applicable.

A preferred class of amino alkanols used as starting materials in this invention have the formula

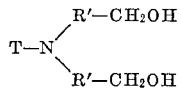

wherein R' is an alkylene radical, straight or branched chain, having up to about four carbons and T is a radical selected from (i)                           —R'—$CH_2OH$ (ii)

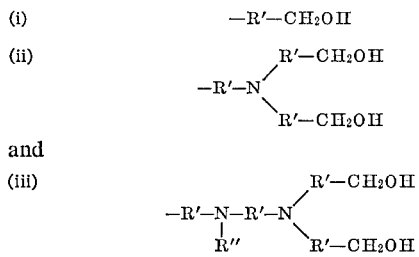

and (iii)

wherein R' has the same significance as above and R" is H or an alkyl radical of up to 4 carbons.

Because they are more readily available, highly preferred tertiary amino alcohols are those having

—$CH_2$—$CH_2OH$ groups bonded to the nitrogen. The simplest compound of this type is triethanolamine, $N(CH_2CH_2OH)_3$. Other amino alcohols within this preferred class are prepared by reacting ethylene or propylene diamine with ethylene oxide. They have the formula

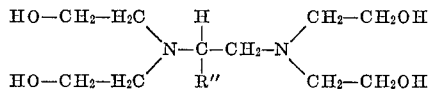

wherein R" is methyl or hydrogen.

Another preferred compound is prepared from diethylene triamine and ethylene oxide and has the formula

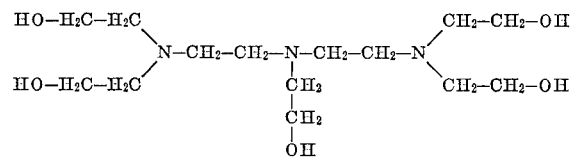

The analogous compound prepared from ethylene oxide and triethylene tetramine is also a preferred starting material. With regard to the preparation of the polyamino compounds mentioned above, reference is made to page 6 of British Pat. 601,817.

Good results are achieved when at least a stoichiometric amount of alkali metal hydroxide is employed. Best yields are obtained when the hydroxide is used in excess. Hence, I prefer to use at least a 10 mole percent excess of alkali metal hydroxide. Thus, for example, when reacting one mole of triethanolamine (which has three reactable hydroxy groups) I prefer to use at least 3.3 moles of metal hydroxide. There appears to be no real upper limit on the amount of excess hydroxide and this is governed by economics, size of reaction vessel, ease of separation of desired product, and similar considerations. Generally good results are obtained when up to 0.5 mole excess is employed, but greater amounts of metal hydroxide can be used, if desired.

The cadmium catalyst can be a wide variety of cadmium containing materials such as cadmium metal, cadmium oxide, simple cadmium (II) salts as cadmium acetate, propionate, or butyrate as well as cadmium chloride and sulfate. The range of amounts of catalyst is one atom of cadmium for each 10 to 1000 primary hydroxyl groups in the aminoalkanol to be reacted. An optimum range in many instances is one atom of cadmium per each 20 to 200 primary alcohol groups (in the amino alkanol to be reacted).

The promoter paraffin is a long chain hydrocarbon having the formula R—$CH_3$ wherein R is a hydrocarbyl alkyl radical. Best results are achieved when the paraffin has at least 10 carbon atoms. I am unaware of any real upper limit on the number of carbons but prefer use of paraffins of 10–25 carbons, especially 10–20 carbon atoms, because these paraffins are more readily available. Although it is not necessary to use straight chain paraffins, they are preferred because of availability. Paraffins having α-methyl branching are another preferred class of promoter paraffins. The amount of paraffin employed is from 0.05 to 10 moles per mole of catalyst. A preferred range is from 0.1 to 1.0 mole.

For the process of this invention, water is a necessary ingredient. As appreciated by a skilled practitioner, the amount of water present will be governed to some extent by the reaction temperature, which preferably, is within the range of from about 150° to about 260° C.; preferably 190–240° C. In general, it can be stated that the amount of water used is from about 3 to about 10 moles per mole of triethanolamine. However, it is not necessary to carefully add this amount of water to the reaction zone. In fact, a preferred method for getting water into the reaction zone is to add the metal hydroxide in the form of a concentrated solution (say 50 percent by weight) and then heat the reaction mass in an open vessel until the desired reaction temperature is obtained.

The reaction pressure is not critical; ambient and superatmospheric pressures up to say 1000 p.s.i.g. can be used. The reaction time is somewhat extended; good results being usually achieved in 8–70 hours.

The method of adding the reactants to the reaction zone is not critical. If desired, all reactants can be added to the vessel and the contents can then be heated to reaction temperature. Alternatively, the water, promoter and/or catalyst can be added in incremental amounts.

In the example following, nitrilotriacetate acid is abbreviated as NTA.

EXAMPLE I

A 300 ml. alkali-resistant Erlenmeyer flask was charged with 25 ml. (0.476 mole) of 50.1 percent sodium hydroxide solution, 25 ml. of n-hexadecane, 50 ml. of toluene, and 2.00 g. (0.0075 mole) of cadmium acetate dihydrate dissolved in 25 ml. of water. This mixture was heated to reflux and the water was separated and collected in a Dean-Stark trap. The contents of the flask were allowed to cool and 18.57 g. (0.125 mole) of triethanolamine, 2.32 g. (0.0181 mole) of cadmium oxide, 50 ml. of toluene and 0.1 g. of sodium stearate were added. When the mixture was heated to reflux an additional 3 ml. of water was collected. The temperature was then raised to 220° C. After 2 hours gas evolution had occurred and the reaction mixture was cooled and 20 ml. of water was added to it. The temperature was gradually raised and water and toluene were both distilled out of the reaction mixture and 18 ml. had been collected. The reaction was run for 25 hours at which time gas evolution had reached 67.3 percent. The initial pseudo first order rate constant was 0.134 hr.$^{-1}$. The catalyst appeared to have been largely reduced to the metal.

The reaction mass was dissolved with water. The n-hexadecane was extracted with 1:1 ether-pet. ether. The catalyst was removed by filtration. The solution was concentrated in a rotary evaporator, then transferred to a clean reaction flask and 1.63 g. of cadmium oxide and 25 ml. of n-hexadecane were added. The reaction was heated and after the water had distilled out the temperature was raised to 220°. The initial rate constant was 0.064 hr.$^{-1}$. After 17 hours the gas evolution had reached 80.3 percent and the reaction mixture was cooled. To the cooled mixture was added 30 ml. of n-hexadecane and 30 ml. of water. After the excess water was distilled off the reaction mixture was heated to 220° for 3 hours. Gas evolution reached 82.6 percent of theory and the initial rate constant was 0.016 hr.$^{-1}$.

The reaction mixture was cooled, dissolved with water, and transferred to a separatory funnel. The hexadecane was separated and the catalyst was filtered off. The aqueous solution was acidified to pH 0 with sulfuric acid, was concentrated in a rotary evaporator to 600 ml., and was seeded with several small crystals of NTA. The tan-colored crystals which formed were collected and washed with water. Recrystallization yielded 11.20 g. (46.9 percent) of NTA in two crops, M.P. 247° d.

Similar results are obtained if cadmium metal, cadmium oxide, cadmium propionate, cadmium butyrate, cadmium sulfate or cadmium chloride is used as the catalyst in the above procedure.

Similar results are also obtained when n-undecane, n-decane, n-tetradecane, n-pentadecane, cetane, and eicosane are used as the promoter.

Similar results are obtained when the reaction temperature is 150°, 190°, 200°, or 240° C.

Similar results are obtained when the amount of sodium hydroxide is from 3.3 to 4.15 moles per mole of triethanolamine.

EXAMPLES II–VI

Other amino alkanols can be reacted according to the process of this invention. To illustrate this, other preparations following the procedure of Example I are summarized below. In each instance below the catalyst added to the reaction mixture is cadmium oxide. In the first two preparations, the promoter is decane. In the remainder, the promoter is eicosane. The first preparation is conducted at 190° C., the next at 210°, all others at 230–240° C. Ambient pressures are used. Sodium stearate is not added.

In the first example below a 10 mole percent excess of sodium hydroxide is employed. In all others, a 50 mole percent excess is used. The amount of catalyst in all but the first preparation below is equivalent to one atom of cadmium per each 20 hydroxyl groups in the amino alkanol. In the first, the amount of catalyst is one atom of cadmium per each 200 hydroxyl groups in the amino alkanol. In the first example below, the amount of promoter is 1.0 mole per mole of alkanolamine. In all others the amount of promoter is 0.05 mole per mole of alkanol amine. In the first example below the amount of water is 3 moles per mole of alkanol amine, in all others 10 moles per mole of alkanol amine is employed.

| Example | Alkanolamine | Product |
|---|---|---|
| II | Monoethanolamine | Glycine. |
| III | Tetraethanol ethylene diamine. | Tetracarboxymethyl ethylene diamine. |
| IV | Tetraethanol propylene diamine. | Tetracarboxymethyl propylene diamine. |
| V | Pentaethanol diethylene triamine. | Pentacarboxymethyl diethylene triamine. |
| VI | Hexaethanol triethylene tetramine. | Hexacarboxymethyl triethylene tetramine. |

EXAMPLES VII–IX

Examples II–VI are repeated using potassium hydroxide instead of sodium hydroxide.

Having fully described the process of this invention, it is desired that the scope of the protection granted be limited solely by the lawful scope of the appended claims.

I claim:

1. In a process for the preparation of an alkali metal salt of a tertiary amino carboxylic acid, which comprises reacting
    an alkali metal hydroxide selected from NaOH and KOH, and
    a tertiary amino alcohol having at least one primary alcohol group,
said process being conducted in the presence of water and a cadmium catalyst; the improvement which comprises:
    conducting said process in the presence of from about 0.05 to about 1.0 mole—per each mole of amino alcohol—of a paraffin having the formula R—CH$_3$, wherein R is an alkyl group of from about 9 to about 19 carbon atoms.

2. The process of claim 1 wherein said metal hydroxide is sodium hydroxide.

3. The process of claim 2 wherein said amino alcohol is triethanolamine.

4. The process of claim 3 wherein from 3.3 to 4.15 moles of sodium hydroxide are used per each mole of triethanolamine.

5. The process of claim 4 wherein said process is conducted at a temperature within the range of from about 150° to about 240° C.

6. The process of claim 5 wherein said promoter is hexadecane.

References Cited

UNITED STATES PATENTS 2,384,817  9/1945  Chitwood _____ 260—531

LORRAINE A. WEINBERGER, Primary Examiner

D. E. STENZEL, Assistant Examiner